United States Patent [19]

Brown et al.

[11] Patent Number: 4,648,606

[45] Date of Patent: Mar. 10, 1987

[54] SEALS

[75] Inventors: Allan P. Brown, Ottawa; Leonard J. Charlebois, Kanata, both of Canada

[73] Assignee: Northern Telecom Limited, Montreal, Canada

[21] Appl. No.: 752,748

[22] Filed: Jul. 8, 1985

[51] Int. Cl.$^4$ ............... F16J 15/02; H02G 15/00
[52] U.S. Cl. .................. 277/188 R; 174/77 R; 174/92; 277/189; 277/192; 277/215
[58] Field of Search ............ 277/58, 59, 215, 154, 277/192, 199, 61, 63, 126, 129, 181–184, 50, 51, 44, 45, 47, 35, 100, 193, 189, 188 R; 174/77 R, 92

[56] References Cited

U.S. PATENT DOCUMENTS

| | | | |
|---|---|---|---|
| 2,388,925 | 11/1945 | Messinger | 277/184 |
| 2,854,260 | 9/1958 | Skinner | 277/215 |
| 3,692,926 | 9/1972 | Smith | 277/199 X |
| 4,332,367 | 6/1982 | Nelson | 277/192 X |
| 4,508,312 | 4/1985 | Taylor et al. | 277/215 X |

FOREIGN PATENT DOCUMENTS 2050536 12/1971 Fed. Rep. of Germany ........ 174/92

Primary Examiner—Allan N. Shoap
Attorney, Agent, or Firm—R. J. Austin

[57] ABSTRACT

A seal for a cylindrical article and having two sealing members which coact to form the seal. Each sealing member has a resiliently flexible body which is connected to a rigid support at two spaced positions around the body. An intermediate portion of the body is resiliently flexible outwards between the two spaced positions while two body end portions extending beyond the spaced positions are caused to resiliently flex inwards. Alternatively, outward flexing of the end portions is accompanied by inward flexing of the intermediate portion. The change in shape caused by this flexibility enables the seal to be used upon a range of different diameters of articles.

6 Claims, 7 Drawing Figures

SEALS

This invention relates to seals.

In some industries, it is necessary for operators working in the field to seal articles, for instance against the effects of the surrounding atmosphere. Various methods of sealing have been suggested and one which has recently been proposed and has been successfully used is a method of sealing by providing a mold which surrounds the article and an encapsulation is formed around the article by transferring heated molten plastics material into the mold cavity and allowing it to cool and set. Encapsulations formed by molding techniques have successfully been employed in the telecommunications cable industry. In the telecommunications cable industry, it is necessary to form splices in the field and this involves cutting into a cable to enable the conductors to be reached. The conductors are then severed and electrically connected to other wires leading from the cable, such connections forming the splices. It is then necessary to seal around the area of the splice to prevent the splices from being adversely affected by atmospheric conditions such as dampness. The use of polymeric materials as molded encapsulations around such splice has simplified previous encapsulation procedures and also has cheapened the encapsulation process.

Successful methods of sealing including the molded encapsulations have been described in U.S. Pat. Nos. 4,152,539 granted May 1, 1979 and 4,322,573 granted Mar. 13, 1982, both patents being in the name of L. J. Charlebois.

A problem which exists in molding encapsulations around splice regions in the cable industry is that end seals are required at the ends of the mold, i.e. surrounding the cable. If the encapsulations are to be provided in the field or are preformed in a factory environment, there are still a large amount of cable sizes which require encapsulation. These cable sizes may lie anywhere within a range from 0.75 inches to 2.77 inches or more in diameter. Because of these various diameters, many different seal sizes are required. Six different seal sizes are required for encapsulating the cable sizes between 0.75 inches and 1.50 inches and many more are required for the full range of cable sizes indicated above. As may be imagined, the molding of the encapsulations in the field involves the transportation of many items of equipment. The use of such a large amount of different sizes of seals adds unduly to the complete inventory of the molding equipment much of which is necessarily carried manually.

The present invention provides a seal of such a construction that is suitable for sealing around cylindrical articles having a range of diameters. Hence, a limited number of seals are required to seal around telecommunications cables having a full range of diameters.

Accordingly the present invention provides a seal comprising at least two sealing members which when closed together define an aperture and provide a surface of the aperture for sealing against a substantially cylindrical article when surrounded by the seal, each sealing member comprising a resiliently flexible arcuate body having a concave sealing portion projecting from the body radially inwards of the arc of the body to provide a part of the sealing surface, the body flexibly and resiliently connected to a rigid support means located axially of the body, the support means and body connected at two fixed mounting positions spaced apart circumferentially around the body to provide an intermediate body arcuate portion extending between the two mounting positions and arcuate body end portions extending freely beyond each mounting position, the intermediate portions and end portions having freedom to move radially of the arc, and from a normal unstrained position of the such that resiliently flexibly moving body, the intermediate portion about the two positions in one radial direction of the arc of the body resiliently flexibly moves the end portions in an opposite direction of the arc of the body.

With the above seal according to the invention, it is preferred to have the intermediate portion movable radially in either direction in which case the end portions also are movable in either direction.

The body action is analogous to that of a metal beam supported at two spaced positions with ends extending beyond these positions. Such a beam when having a load placed on it between its support positions will deflect downwardly and its ends will flex upwardly so that the neutral beam axis takes on a curved shape. On the other hand, loads placed on the ends of the beam will cause it to flex in the opposite direction. Thus, with each sealing member, the neutral axis of the body lies substantially on an arc of a circle of specific radius in the normal unstrained position. However if the intermediate body portion is flexed radially outwards, the end portions will flex radially inwards thereby decreasing the radius of the arc of neutral axis. Alternatively, if the end portions are flexed radially outwards then the intermediate portion is flexed inwards thereby increasing the radius of the arc. Hence, if the sealing members are closed together around a cylindrical article of substantially the correct diameter for the seal in the normal unstrained position of the members, then substantially no flexing movement of each body will occur except for that which is normal, i.e. that of each arcuate sealing portion to ensure that a sealing contact is made with the article. If the diameter of the article is less than the correct one, then it will contact the inner portion thus causing the body to decrease in diameter and engage the article continuously along the sealing portion. In contrast, if the diameter of the article is too great, then the article will contact the end portions of the seal firstly, thereby flexing the end portions outwardly to increase the diameter of the body.

The total arcuate length along the body is sufficient that when the sealing members are assembled around the article of largest diameter for which it is designed, then the sealing portions engage end-to-end to complete the sealing surface. If the seal is placed around smaller diameter articles, then the bodies are compressible circumferentially to engage the article in continuous fashion.

Preferably, the body of each sealing member has its two connecting positions to the support means disposed radially outwards from the body and the body has radially outward extensions which extend to these positions. These extensions are resiliently flexible and thus add to the flexibility of the body and the extensions may be pivotally movable around the mounting positions for additional freedom of flexing of the body.

Also, in a preferred arrangement, the rigid support means comprises two rigid members which are disposed axially at each side of the body. It is also preferred to have the body integrally formed with a stabilizing member which extends between the mounting positions and connects the two extensions together to provide some stabilizing and stiffening effect to the movement of the body. Preferably, the stabilizing member is integral with the extensions and is itself formed from resiliently flexible material.

One embodiment of the invention will now be described by way of example, with reference to the accompanying drawings, in which:

FIG. 1 is a cross-sectional view through a mold enclosing a cable splice and preparatory to a molding of a surrounding encapsulation;

FIG. 2, on a larger scale than FIG. 1, is a view similar to FIG. 1 showing an arrangement of seals at one end of the mold;

Figure 6:
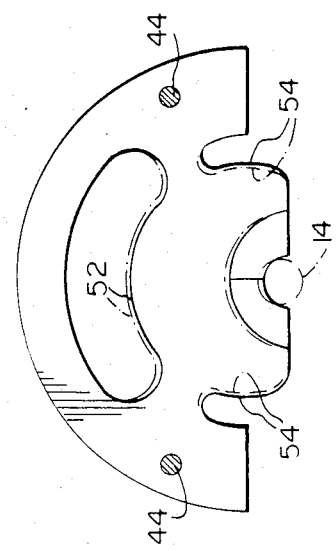
Figure 7:
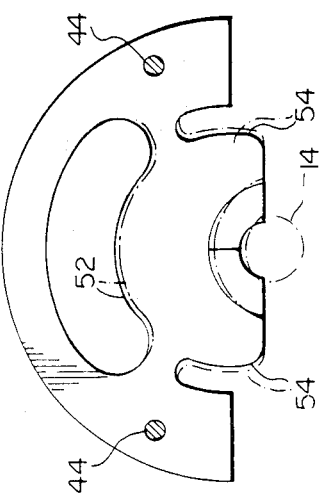
Figure 3:
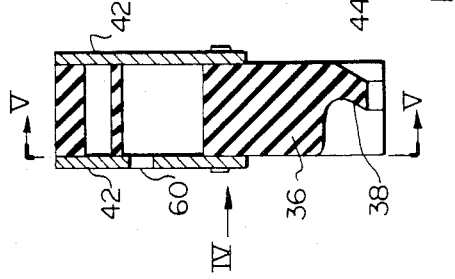
FIG. 3 is on a larger scale than FIG. 2, and is a cross-sectional view showing the structure of a seal along its axis.

FIGS. 6 and 7 on the same scale as FIG. 3, show the sealing action of the seal when cables of different outside diameter are placed inside it.

The embodiment is concerned with the molding of an encapsulation around a splice region of a telecommunications cable. The mold is to operate at a low mold pressure, i.e. below 100 pounds per square inch and may be of the construction described in U.S. Pat. Nos. 4,152,539 and 4,322,573. The mold 10 as shown in FIG. 1 in closed position, surrounds a spliced region 12 of a cable 14 which extends outwards from both end regions 16 of the mold.

Figure 1:
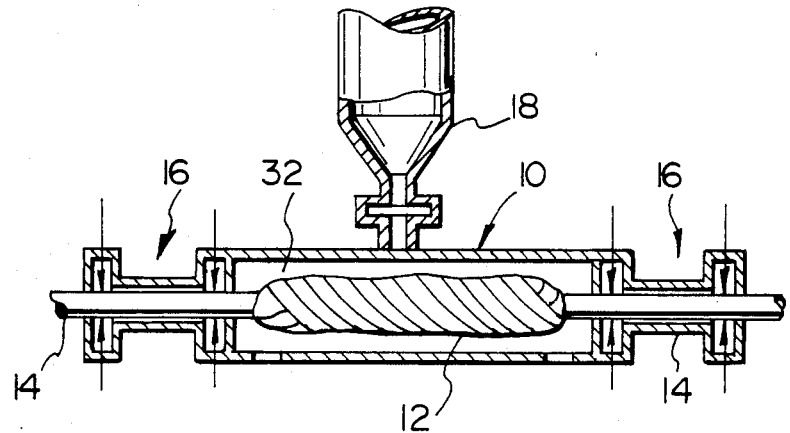
Figure 2:
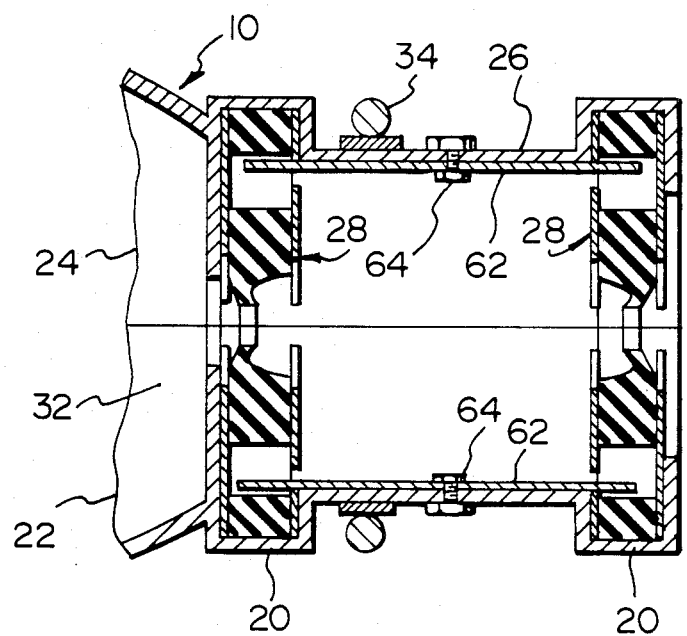

As shown by FIG. 1, the mold is for use in molding a plastics encapsulation around the splice region in an in situ situation, that is at the bottom of a pit in the ground for encapsulating and sealing splices formed in underground cable. The molding operation in such an in situ situation may be performed by the method and using the apparatus described in copending U.S. patent application Ser. No. 668,601 filed Nov. 5, 1984 in the name of L. J. Charlebois and entitled "Encapsulating Articles", and now abandoned, and in copending U.S. patent application Ser. No. 668,600 also filed on Nov. 5, 1984 in the name of L. J. Charlebois and entitled "Molding of Plastics Encapsulation" and now abandoned. As described in the above patent applications, the molding operation is performed by a manually portable container 18 for molten plastics material. The container has a reservoir for the molten material and a heating and heat insulating means (not shown) for rendering into a plastics and moldable form, non-molten material placed within the reservoir prior to the molding operation. Each end region 16 of the mold 10 is basically of the design shown by FIG. 2. As shown in FIG. 2, each end region comprises two annular inwardly directed recesses 20 formed by the closed together mold halves 22 and 24. These recesses are joined together by a smaller diameter neck portion 26. Each recess 20 houses a sealing member 28. The four sealing members are aligned in two pairs with the sealing members in each pair forming a complete seal in the assembly. FIG. 2 shows the arrangement of seals with the mold closed and without a cable for clarity. The two seals are axially spaced apart at each end of the mold so as to grip the cable at two spaced positions as shown in FIG. 1 by the arrows. This stabilizes the cable and thus the splice region substantially centrally within the mold cavity 32 (FIG. 1). Without the use of two spaced seals in each end region 16, there would be a tendency for the cable to rock about a single seal at each end of the mold thereby permitting the splice region within the mold cavity to move laterally under bending of the cable exteriorly of the mold. Conveniently, the neck portion 26 at each end region of the mold is encircled by a toggle clamp 34 and the two toggle clamps together with other clamps (not shown) along the mold hold the mold halves 22 and 24 in a closed condition. The mold halves are hinged together along an axially extending line (not shown) along one longitudinal edge of the mold.

Figure 4:
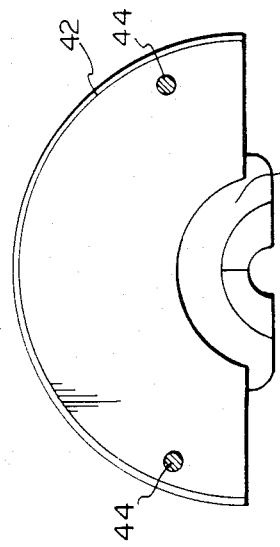
FIG. 4 is a view of the seal taken in the direction of arrow IV in FIG. 3.
Figure 5:
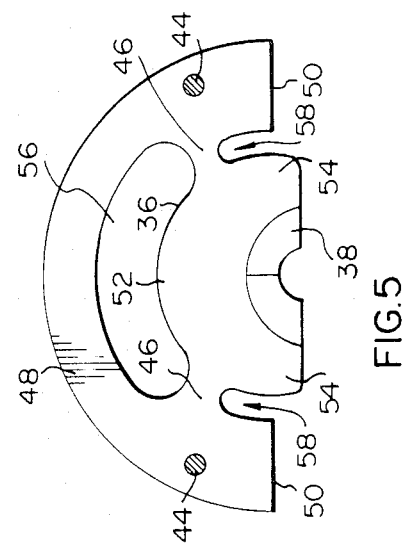
FIG. 5 is a cross-sectional view along line V—V in FIG. 3.

As shown by FIGS. 3, 4 and 5, each sealing member 28 comprises a resiliently flexible arcuate body 36 formed from plastics material of sufficiently high softening temperature to withstand the temperature conditions when contacted by the molten material to be passed into the mold. Each of the arcuate bodies 36 has an arcuate sealing portion 38 projecting radially inwards of the arc of the body as shown clearly from FIG. 5. This sealing portion provides a part of an annular sealing surface formed when the two opposed sealing members are closed together around the cable 14 to form a seal 30 during a molding operation. Body 36 is flexibly and resiliently connected to a rigid support means in the form of two spaced apart metal plates 42 (FIGS. 3 and 4) which sandwich the outer regions of the body between them. The body is secured at two positions to the plates 42 by means of two rivets 44 which are spaced apart circumferentially around the body and lie radially outwards from the body. The body has radially outward extensions 46 which extend to an arcuate stabilizing member 48 surrounding the body and encompassing the rivet positions. The stabilizing member extends beyond the rivet positions as shown by FIG. 5 and terminates at end faces 50 which are almost diametrically opposed with regard to the center of radius of the body 36. The body has an intermediate body portion 52 which extends between the rivets 44 and thus between the extensions 46. The body also has two end portions 54 which extend freely from the intermediate body portion away from the extensions 46. As seen from FIG. 5, between the extensions 46 is disposed a circumferentially extending space 56 formed between the stabilizing member 48 and the intermediate body portion 52. In addition, gaps 58 are provided between the end portions 54 and the stabilizing member 48. As will be described the space 56 and the gaps 58 perform the function of allowing radial outward movement of the portions 52 and 54 of the body during a sealing operation. The arrangement described above is such that while the two rivets 44 hold the body 36 relative to the plates 42, nevertheless between the rivets 44 the body 36 has a degree of radial movement relative to the plates 42.

The above described seal 30 incorporating two sealing members 28 is designed for low molding pressure application below 100 pounds per square inch to accommodate and seal effectively against cable sizes varying within a certain range of diameters. For instance, and for reasons which will become clear below, each seal 30 when designed to the required size, is capable of sealing effectively against any cable lying within a diameter range from approximately 0.75 inches to 1.50 inches. In contrast, six seal sizes have previously been required for sealing effectively against cables lying within the quoted range.

Sealing members 28 act in the following manner when being sealed against a cable. The bodies 36 in an unstrained position are of the shape shown by FIG. 5.

When the two mold halves are closed around the cable, then if the cable size is correct for the unstrained body shape, substantially no distortion of the body will take place except for a compression and radially outward displacement of the sealing portions 38 which is normal for any seal when sealing against a substantially cylindrical article. If however the mold is closed around a cable of smaller diameter than the correct diameter for the unstrained shape of the body, then as the mold halves close together the cable contacts each intermediate portion 52 of the body before the end portions 54 are engaged by the cable. Upon contact being made and as closing proceeds then because of the freedom of outward movement of the intermediate body portion 52, the intermediate portion moves radially outwards under the pressure of the cable and this is accompanied by a flexing movement of the two extensions 46 relative to the rivets 44 and also with regard to the body. As a result of this flexing movement, the two end portions 54 move in the opposite direction from the body, i.e. radially inwards towards the cable until the cable is engaged by the whole of the sealing region 38. The shape of the sealing region 38 and of each body 36 is then as shown chain-dotted in FIG. 6. The cable 14 position is also shown chain-dotted. The two sealing members are of course acting together on opposite sides of the cable. Should the total length of the sealing portions 38 be greater than the circumferential distance around the cable, then mutual compression of the material in the end portions 54 and also displacement of the extensions 46 allows the sealing action to take place with the end portions of the opposed sealing members abutting tightly together.

On the other hand, if the cable is of a diameter larger than that which is correct for the unstrained body 36, then upon closing of the mold it will initially engage the end portions 54 so as to move them radially outwards. This radially outward movement produces a flexing of the body 36, which is substantially opposite to that described with regard to FIG. 6 in that the intermediate body portion 52 is resiliently flexed radially inwards primarily by the flexing movement of the extensions 46. As a result, larger diameter cables are accommodated by the sealing members also.

During the whole of the closing and sealing action, the stabilizing members 48 provide some stabilizing effect to control the degree of flexure of the body portion 36.

As may be seen from the above, the allowance for radially outward movement of the intermediate and end portions of the body enables the body to be flexed so as to cause its neutral axis to assume arcs of different radius dependent upon the position of application of radial pressure upon the body, i.e. by smaller or larger diameter cables. The fact that the body is free to move between the plates 42 obviously is an essential factor. Should the body be mounted securely and immovably at any position between the plates, then the seal would act solely by compression of the material as with a normal seal and would not change in general shape. However, the complete flexing movement allowed at the two spaced apart mounting positions, i.e. by the rivets 44, allow the body of each sealing member to accommodate itself in shape sufficiently to seal effectively against any cable within a certain range of cable diameters.

It is clear from the above that the invention provides a seal of substantially simple design which is capable of replacing a large number of differently sized seals for sealing against cylindrical articles of different diameters. In the particular case discussed with regard to telecommunications cables, this seal reduces the inventory for the parts of the molding apparatus required which is particularly important when molding of encapsulations is to be performed in situ around underground cables which differ in diameter from one cable to the next.

The sealing members 28 are assembled to form a seal assembly in a convenient manner as described in copending patent application Ser. No. 752,746 filed July 8, 1985 and entitled "Seal Assembly" and in the names of A. P. Brown and L. J. Charlebois and now U.S. Pat. No. 4,609,773, issued Sept. 2, 1986. As described in the last mentioned application, one of the plates 42 of each of the sealing members is formed with an aperture 60 (FIG. 3) and two of the sealing members, that is one from each seal 30 and in axial alignment, are detachably held in their recesses 20 by a retaining means in the form of a metal bar 62 which extends axially along the neck portion 26 and projects into each of the slots 60 (FIG. 2). The bar 62 is held in position to the neck portion of its respective mold half by a simple screw or bolt 64 which has its head disposed within the neck portion and away from any contact with the cable. As can be seen, this structure is particularly useful when an assembly for the mold is to be made or broken down in the field. Removal of the bolt 62 immediately enables the sealing members to be removed from their recesses and assembling of the sealing members is also performed simply and relatively quickly.

In addition, although the body portions 36 of the sealing members 28 have high flexibility and resiliency, nevertheless they are capable of providing adequate gripping force to a cable. With longer molds, viscous drag forces develop as the molten material flows inside the mold cavity. This tends to move the mold axially of the cable. The seals described in the embodiment, successfully anchor the mold in position by gripping the cable to withstand a 200 pounds axial force which is sufficient for this low pressure molding operation.

What is claimed is:

1. A seal comprising at least two sealing members which when closed together define a central aperture and provide a surface of the aperture for sealing against a substantially cylindrical article when surrounded by the seal, each sealing member comprising a resiliently flexible arcuate body having a partially arcuate periphery and a concave sealing portion projecting from the body radially inwardly of the arc of the body, opposite said arcuate periphery, to provide a part of the sealing surface, the body flexibly and resiliently connected to a rigid support means located axially of the body, the support means and body connected at two fixed mounting positions spaced from and located radially outwardly of said arcuate periphery and spaced apart circumferentially around the body, each position being connected to said body by an extension projecting radially outwardly from the body between said arcuate periphery and the respective mounting position, said body being an intermediate arcuate body portion extending circumferentially between said two mounting positions and arcuate end portions extending circumferentially from opposite ends of said intermediate body portion, the intermediate body portion and end portions having freedom to move radially of the arc of the body from a normal unstrained position of the body, such that resiliently, flexibly moving the intermediate body portion about the two positions in one radial direction of the arc of the body resiliently, flexibly moves the end portions in an opposite radial direction of the arc of the body.

2. A seal according to claim 1 wherein each sealing member includes an arcuate portion between and connecting the two extensions and spaced radially from said intermediate body portion.

3. A seal according to claim 2 wherein each extension and is flexible around its mounting positions for additional flexing freedom of the body.

4. A seal according to claim 3 provided with an arcuate stabilizing member which extends between the mounting positions radially outwardly of the body and connects the two extensions together to provide a stabilizing and stiffening effect to the body.

5. A seal according to claim 4 wherein the stabilizing member is integrally formed with the extensions and with the body.

6. A seal according to claim 1 wherein the rigid support means comprises two rigid members which are disposed axially at each side of the body.

* * * * *